United States Patent
Xu et al.

(10) Patent No.: US 12,101,818 B2
(45) Date of Patent: Sep. 24, 2024

(54) RANDOM ACCESS METHOD AND APPARATUS

(71) Applicant: Huawei Technologies Co., Ltd., Shenzhen (CN)

(72) Inventors: Xiaoying Xu, Shanghai (CN); Qufang Huang, Shenzhen (CN); Chunhua You, Shanghai (CN); Qiang Fan, Hefei (CN); Yinghao Guo, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 17/402,401

(22) Filed: Aug. 13, 2021

(65) Prior Publication Data
US 2021/0378023 A1    Dec. 2, 2021

Related U.S. Application Data

(63) Continuation of application No. PCT/CN2020/075126, filed on Feb. 13, 2020.

(30) Foreign Application Priority Data

Feb. 15, 2019 (CN) .......................... 201910118213.7

(51) Int. Cl.
*H04W 74/08* (2024.01)
*H04W 74/00* (2009.01)
(Continued)

(52) U.S. Cl.
CPC ..... *H04W 74/0833* (2013.01); *H04W 74/006* (2013.01); *H04W 72/23* (2023.01)

(58) Field of Classification Search
None
See application file for complete search history.

(56) References Cited

U.S. PATENT DOCUMENTS

2015/0223270 A1*  8/2015  Kim ............... H04W 36/0005
                                                370/329
2017/0094687 A1*  3/2017  Kato ............... H04W 74/0833
(Continued)

FOREIGN PATENT DOCUMENTS

CN    102047586 A    5/2011
CN    102342167 A    2/2012
(Continued)

OTHER PUBLICATIONS

"Procedures Related to Noma," 3GPP TSG RAN WG1 Meeting #95, Spokane, USA, R1-1813407, Total 9 pages, 3rd Generation Partnership Project, Valbonne, France (Nov. 12-16, 2018).
(Continued)

*Primary Examiner* — Eunsook Choi
(74) *Attorney, Agent, or Firm* — Leydig, Voit & Mayer, Ltd.

(57) ABSTRACT

A random access method is provided including: a terminal side device obtains first uplink data from a first message buffer, wherein the first message buffer is a buffer specific to a first random access procedure, the first random access procedure is a procedure in which the terminal side device sends a first random access request, sends the first uplink data on a first uplink resource, and receives response information, and the response information is a first random access response to the first random access request or a response to the first uplink data. The terminal side device sends the first random access request to a network side device, and sends the first uplink data to the network side device on the first uplink resource. The terminal side device detects downlink control information, wherein the downlink control information indicates a resource of the response information.

15 Claims, 9 Drawing Sheets

(51) Int. Cl.
*H04W 74/0833* (2024.01)
*H04W 72/23* (2023.01)

(56) References Cited

U.S. PATENT DOCUMENTS

| | | | | |
|---|---|---|---|---|
| 2018/0124724 | A1* | 5/2018 | Tsai | H04W 74/0833 |
| 2018/0184439 | A1* | 6/2018 | Lee | H04W 72/21 |
| 2018/0332467 | A1 | 11/2018 | Tenny et al. | |

FOREIGN PATENT DOCUMENTS

| | | |
|---|---|---|
| CN | 102612143 A | 7/2012 |
| CN | 104380765 A | 2/2015 |
| CN | 108282899 A | 7/2018 |
| RU | 2672859 C2 | 11/2018 |
| WO | 2018175809 A1 | 9/2018 |
| WO | 2019029363 A1 | 2/2019 |

OTHER PUBLICATIONS

"2-Step random access procedure in NR," 3GPP TSG-RAN WG2 #96, R2-168520, Reno, Nevada, pp. 1-4, 3rd Generation Partnership Project, Valbonne, France (Nov. 14-18, 2016).

"3rd Generation Partnership Project; Technical Specification Group Services and System Aspects; Study on Machine-Type Communications (MTC) and other mobile data applications communications enhancements (Release 12)," 3GPP TR 23.887 V12.0.0, pp. 1-151, 3rd Generation Partnership Project, Valbonne, France (Dec. 2013).

"3rd Generation Partnership Project; Technical Specification Group Radio Access Network; NR; Medium Access Control (MAC) protocol specification (Release 15)," 3GPP TS 38.321 V15.4.0, pp. 1-77, 3rd Generation Partnership Project, Valbonne, France (Dec. 2018).

"UE switch from CBRA to CFRA and possible issues," 3GPP TSG-RAN WG2 AH 1807, Montreal, Canada, Tdoc R2-1810084, Total 2 pages, 3rd Generation Partnership Project, Valbonne, France (Jul. 2-6, 2018).

"Further considerations on 2-step Rach," 3GPP TSG-RAN WG2 Meeting #103bis, R2-1813965, Chengdu, China, Total 7 pages, 3rd Generation Partnership Project, Valbonne, France (Oct. 8-12, 2018).

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.4.0, pp. 1-131, 3rd Generation Partnership Project, Valbonne, France (Dec. 2018).

"3rd Generation Partnership Project; Technical Specification Group Radio Access Network; NR; NR and NG-RAN Overall Description; Stage 2 (Release 15)," 3GPP TS 38.300 V15.4.0, pp. 1-97, 3rd Generation Partnership Project, Valbonne, France (Dec. 2018).

"3rd Generation Partnership Project; Technical Specification Group Radio Access Network; NR; Radio Resource Control (RRC) protocol specification (Release 15)," 3GPP TS 38.331 V15.4.0, pp. 1-474, 3rd Generation Partnership Project, Valbonne, France (Dec. 2018).

"New SI proposal: Study on UL data compression in LTE," 3GPP TSG RAN Meeting #74, RP-162541 revision of RP-162051, Vienna, Austria, Total 7 pages, 3rd Generation Partnership Project, Valbonne, France (Dec. 5-8, 2016).

* cited by examiner

RANDOM ACCESS METHOD AND APPARATUS

CROSS-REFERENCE TO RELATED APPLICATIONS

This application is a continuation of International Application No. PCT/CN2020/075126, filed on Feb. 13, 2020, which claims priority to Chinese Patent Application No. 201910118213.7, filed on Feb. 15, 2019. The disclosures of the aforementioned applications are hereby incorporated by reference in their entireties.

TECHNICAL FIELD

Embodiments of this application relate to the communication field, and in particular, to a random access method and an apparatus.

BACKGROUND

In a wireless communication system, a terminal side device may access a network side device (for example, a base station) through a four-step random access procedure. As shown in FIG. 1, the four-step random access procedure includes: Step S1: The terminal side device selects a preamble index and a physical random access channel (PRACH) resource used to send a preamble, and sends the preamble on the resource. Step S2: The base station sends a random access response (RAR) to the terminal side device. Step S3: The terminal side device sends a message 3 (Msg3) to the base station based on the random access response, where the Msg3 includes uplink data. Step S4: The base station sends a message 4 (Msg4) to the terminal side device, where the Msg4 includes contention resolution information, so that the terminal side device accesses the base station.

Currently, in a 5th generation (5G) mobile communication system, a two-step random access procedure is proposed. As shown in FIG. 2, the two-step random access procedure includes: Step S1: A terminal side device selects a PRACH resource used to send a preamble, obtains an uplink resource used to send uplink data, sends the preamble on the PRACH resource, and sends the uplink data on the uplink resource. Step S2: A base station sends response information, for example, a message B (MsgB), to the terminal side device, where the response information may include contention resolution information.

Currently, how the terminal side device manages data buffers of the two-step random access procedure and the four-step random access procedure to avoid confusion in buffer management of different random access procedures is an urgent problem to be resolved.

SUMMARY

Embodiments of this application provide a random access method, to manage a data buffer of a two-step random access procedure, and further to manage a data buffer of a four-step random access procedure. This avoids confusion in buffer management of different random access procedures.

According to a first aspect, an embodiment of this application provides a random access method, including: A terminal side device obtains first uplink data from a first message buffer, where the first message buffer is a buffer specific to a first random access procedure, the first random access procedure is a procedure in which the terminal side device sends a first random access request, sends first uplink data on a first uplink resource, and receives response information, and the response information is a first random access response to the first random access request or a response to the first uplink data. The terminal side device sends the first random access request to a network side device, and sends the first uplink data to the network side device on the first uplink resource. The terminal side device detects downlink control information, where the downlink control information indicates a resource of the response information. The terminal side device receives the response information on the resource indicated by the downlink control information.

Based on the method provided in this embodiment of this application, after initiating the first random access procedure, the terminal side device may obtain the first uplink data from the first message buffer. That is, the first uplink data of the first random access procedure may be managed (stored or obtained) by using the first message buffer. Because the first message buffer is a buffer specific to the first random access procedure, confusion between buffers of different random access procedures can be avoided.

In a possible implementation of the first aspect, when the first random access procedure fails, or when a second message buffer has no uplink data and the first message buffer has uplink data, the second message buffer is specific to a second random access procedure, and the second random access procedure is a procedure in which the terminal side device sends a second random access request, receives a second random access response to the second random access request, and sends second uplink data based on the second random access response; and the method further includes: The terminal side device obtains the second uplink data from the first message buffer in the second random access procedure. In this way, in the second random access procedure, the terminal side device may obtain, from the first message buffer, the second uplink data corresponding to the second random access procedure, so that there is no need to regenerate the first uplink data by using a multiplexing and assembly entity after the first random access procedure fails, thereby improving data transmission efficiency.

In a possible implementation of the first aspect, when the first random access procedure fails, or when a second message buffer has no uplink data and the first message buffer has uplink data, the second message buffer is specific to a second random access procedure, and the method further includes: The terminal side device stores the uplink data in the first message buffer into the second message buffer, and the terminal side device obtains second uplink data from the second message buffer in the second random access procedure. In this way, in the second random access procedure, the terminal side device may obtain, from the second message buffer, the second uplink data corresponding to the second random access procedure, so that there is no need to regenerate the first uplink data by using a multiplexing and assembly entity after the first random access procedure fails, thereby improving data transmission efficiency.

In a possible implementation of the first aspect, the terminal side device stores the first uplink data into the first message buffer and the second message buffer. In this way, if the first random access procedure initiated by the terminal side device fails, and the terminal side device needs to fall back to the second random access procedure, the terminal side device may directly obtain the uplink data from the first message buffer or the second message buffer instead of regenerating the uplink data. This improves the data transmission efficiency. Alternatively, the terminal side device stores the second uplink data into the first message buffer and the second message buffer. In this way, if the second random access procedure initiated by the terminal side device fails, and the terminal side device needs to fall back to the first random access procedure, the terminal side device may obtain the uplink data from the first message buffer or the second message buffer instead of regenerating the uplink data. This improves the data transmission efficiency.

In a possible implementation of the first aspect, when a second random access procedure fails, or when the first message buffer has no uplink data and a second message buffer has uplink data, the second message buffer is specific to the second random access procedure, and the method further includes: The terminal side device obtains the first uplink data from the second message buffer. In other words, when falling back from the second random access procedure to the first random access procedure, the terminal side device may obtain, from the second message buffer, the first uplink data corresponding to the first random access procedure, and does not need to regenerate the first uplink data. This improves data transmission efficiency.

In a possible implementation of the first aspect, the method further includes: The terminal side device obtains the first uplink data from a third message buffer in the first random access procedure, and obtains the second uplink data from the third message buffer in the second random access procedure, where the third message buffer is a buffer shared by the first random access procedure and the second random access procedure.

In a possible implementation of the first aspect, the method further includes: When the terminal side device initializes the first random access procedure, the terminal side device sets a first counter to an initial value, where the first counter is specific to the first random access procedure. If contention resolution in the first random access procedure fails, the terminal side device increases a count value of the first counter by 1. If the first counter reaches a configured maximum value, the terminal side device indicates, to a higher layer (for example, an RRC layer), that the first random access procedure fails, to prevent the terminal side device from frequently restarting the first random access procedure, so as to reduce resource consumption of the terminal side device.

In a possible implementation of the first aspect, the first counter includes a first random access preamble sending counter and/or a first power ramping counter.

In a possible implementation of the first aspect, the method further includes: When the terminal side device initializes the first random access procedure, the terminal side device sets a second counter to an initial value, where the second counter is a counter shared by the first random access procedure and the second random access procedure. If contention resolution in the first random access procedure fails, the terminal side device increases a count value of the second counter by 1. If the second counter reaches a configured maximum value, the terminal side device indicates, to the higher layer (for example, the RRC layer), that the first random access procedure fails, to prevent the terminal side device from frequently restarting the first random access procedure, so as to reduce the resource consumption of the terminal side device.

In a possible implementation of the first aspect, the second counter includes a second random access preamble sending counter and/or a second power ramping counter.

In a possible implementation of the first aspect, if contention resolution in the first random access procedure or the second random access procedure fails, the terminal side device increases a count value of the second random access preamble sending counter by 1.

In a possible implementation of the first aspect, if the terminal side device initiates the first random access procedure again or initiates the second random access procedure, the terminal side device increases a count value of the second power ramping counter by 1.

According to a second aspect, an embodiment of this application provides a random access method, including: A network side device receives a first random access request from a terminal side device, and receives first uplink data from the terminal side device on a first uplink resource, where the first uplink data is obtained by the terminal side device from a first message buffer, the first message buffer is a buffer specific to a first random access procedure, the first random access procedure is a procedure in which the terminal side device sends the first random access request, sends the first uplink data on the first uplink resource, and receives response information, and the response information is a first random access response to the first random access request or a response to the first uplink data. The network side device sends downlink control information, where the downlink control information indicates a resource of the response information. The network side device sends the response information on the resource indicated by the downlink control information.

According to a third aspect, an embodiment of this application provides a random access method, including: When initializing a first random access procedure, a terminal side device sets a first counter to an initial value, where the first counter is specific to the first random access procedure, the first random access procedure is a procedure in which the terminal side device sends a first random access request, sends first uplink data on a first uplink resource, and receives response information, and the response information is a first random access response to the first random access request or a response to the first uplink data. The terminal side device performs the first random access procedure.

In a possible implementation of the third aspect, the method further includes: When initializing the first random access procedure, the terminal side device sets a second counter to an initial value, where the second counter is a counter shared by the first random access procedure and a second random access procedure, and the second random access procedure is a procedure in which the terminal side device sends a second random access request, receives a second random access response to the second random access request, and sends second uplink data based on the second random access response.

According to a fourth aspect, an embodiment of this application provides a terminal side device, including: a processing unit, configured to obtain first uplink data from a first message buffer, where the first message buffer is a buffer specific to a first random access procedure, the first random access procedure is a procedure in which the terminal side device sends a first random access request, sends first uplink data on a first uplink resource, and receives response information, and the response information is a first random access response to the first random access request or a response to the first uplink data; a sending unit, configured to send the first random access request to a network side device, and send the first uplink data to the network side device on the first uplink resource, where the processing unit is further configured to detect downlink control information, and the downlink control information indicates a resource of the response information; and a receiving unit, configured to receive the response information on the resource indicated by the downlink control information.

In a possible implementation of the fourth aspect, when the first random access procedure fails, or when a second message buffer has no uplink data and the first message buffer has uplink data, the second message buffer is specific to a second random access procedure, and the second random access procedure is a procedure in which the terminal side device sends a second random access request, receives a second random access response to the second random access request, and sends second uplink data based on the second random access response; and the processing unit is further configured to obtain the second uplink data from the first message buffer in the second random access procedure.

In a possible implementation of the fourth aspect, when the first random access procedure fails, or when a second message buffer has no uplink data and the first message buffer has uplink data, the second message buffer is specific to a second random access procedure, and the processing unit is further configured to: store the uplink data in the first message buffer into the second message buffer, and obtain second uplink data from the second message buffer in the second random access procedure.

In a possible implementation of the fourth aspect, the processing unit is configured to store the first uplink data into the first message buffer and the second message buffer. Alternatively, the processing unit is configured to store the second uplink data into the first message buffer and the second message buffer.

In a possible implementation of the fourth aspect, when a second random access procedure fails, or when the first message buffer has no uplink data and a second message buffer has uplink data, the second message buffer is specific to the second random access procedure, and the processing unit is further configured to obtain the first uplink data from the second message buffer.

In a possible implementation of the fourth aspect, the processing unit is further configured to: obtain the first uplink data from a third message buffer in the first random access procedure, and obtain the second uplink data from the third message buffer in the second random access procedure, where the third message buffer is a buffer shared by the first random access procedure and the second random access procedure.

In a possible implementation of the fourth aspect, the processing unit is further configured to: when the terminal side device initializes the first random access procedure, set a first counter to an initial value, where the first counter is specific to the first random access procedure.

In a possible implementation of the fourth aspect, the processing unit is further configured to: when the terminal side device initializes the first random access procedure, set a second counter to an initial value, where the second counter is a counter shared by the first random access procedure and the second random access procedure.

According to a fifth aspect, an embodiment of this application provides a network side device, including: a receiving unit, configured to receive a first random access request from a terminal side device, and receive first uplink data from the terminal side device on a first uplink resource, where the first uplink data is obtained by the terminal side device from a first message buffer, the first message buffer is a buffer specific to a first random access procedure, the first random access procedure is a procedure in which the terminal side device sends the first random access request, sends the first uplink data on the first uplink resource, and receives response information, and the response information is a first random access response to the first random access request or a response to the first uplink data; and a sending unit, configured to send downlink control information, where the downlink control information indicates a resource of the response information. The sending unit is further configured to send the response information on the resource indicated by the downlink control information.

According to a sixth aspect, an embodiment of this application further provides a communication apparatus. The communication apparatus may be a terminal side device or a chip. The communication apparatus includes a processor, configured to implement any method provided in the first aspect. The communication apparatus may further include a memory, configured to store program instructions and data. The memory may be a memory integrated into the communication apparatus, or an off-chip memory disposed outside the communication apparatus. The memory is coupled to the processor. The processor may invoke and execute the program instructions stored in the memory, to implement any method provided in the first aspect. The communication apparatus may further include a communication interface. The communication interface is used by the communication apparatus to communicate with another device (for example, a network side device).

According to a seventh aspect, an embodiment of this application further provides a communication apparatus. The communication apparatus may be a network side device or a chip. The communication apparatus includes a processor, configured to implement the method provided in the second aspect. The communication apparatus may further include a memory, configured to store program instructions and data. The memory may be a memory integrated into the communication apparatus, or an off-chip memory disposed outside the communication apparatus. The memory is coupled to the processor. The processor may invoke and execute the program instructions stored in the memory, to implement the method provided in the second aspect. The communication apparatus may further include a communication interface. The communication interface is used by the communication apparatus to communicate with another device (for example, a terminal side device).

According to an eighth aspect, an embodiment of this application provides a computer-readable storage medium, including instructions. When the instructions are run on a computer, the computer is enabled to perform any method provided in the first aspect or the second aspect.

According to a ninth aspect, an embodiment of this application provides a computer program product including instructions. When the computer program product runs on a computer, the computer is enabled to perform any method provided in the first aspect or the second aspect.

According to a tenth aspect, an embodiment of this application provides a chip system. The chip system includes a processor, and may further include a memory. The chip system is configured to implement any method provided in the first aspect or the second aspect. The chip system may include a chip, or may include a chip and another discrete component.

According to an eleventh aspect, an embodiment of this application provides a system. The system includes the terminal side device in the third aspect and the network side device in the fourth aspect.

DESCRIPTION OF EMBODIMENTS

Embodiments of this application provide a random access method and an apparatus. The random access method and the apparatus are used in a mobile communication network, for example, a mobile communication network that supports a plurality of radio interface technologies (RIT).

Figure 3:
FIG. 3 is a schematic architectural diagram of a system applicable to a random access method according to an embodiment of this application.

FIG. 3 is a schematic diagram of a communication system to which a technical solution according to an embodiment of this application is applicable. The communication system may include a network side device 100 and one or more terminal side devices 200 (only one terminal side device 200 is shown in FIG. 3) connected to the network side device 100. Data transmission may be performed between the network side device and the terminal side device.

The network side device 100 may be a device that can communicate with the terminal side device 200. For example, the network side device 100 may be a base station. The base station may be a base transceiver station (BTS) in global system for mobile communications (GSM) or code division multiple access (CDMA), a NodeB (NB) in wideband code division multiple access (WCDMA), an evolved NodeB (eNB or eNodeB) in LTE, a base station in NR, a relay station, an access point, a base station in a future network, or the like. This is not limited in the embodiments of this application. The base station in NR may also be referred to as a transmission reception point (TRP) or a gNB. In the embodiments of this application, the network side device may be an independently sold network side device, for example, a base station, or may be a chip that implements a corresponding function in the network side device. In the embodiments of this application, a chip system may include a chip, or may include a chip and another discrete component. In the technical solutions provided in the embodiments of this application, the technical solutions provided in the embodiments of this application are described by using an example in which an apparatus for implementing a function of the network side device is the network side device.

The terminal side device 200 in this embodiment of this application may also be referred to as a terminal, and may be a device with a wireless transceiver function. The terminal may be deployed on land, including an indoor or outdoor terminal, a handheld terminal, or a vehicle-mounted terminal; or may be deployed on a water surface (for example, on a ship) or in the air (for example, on an airplane, a balloon, and a satellite). The terminal side device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal side device may be a virtual reality (VR) terminal side device, an augmented reality (AR) terminal side device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, the terminal side device may be an independently sold terminal, or may be a chip in the terminal. In the technical solutions provided in the embodiments of this application, the technical solutions provided in the embodiments of this application are described by using an example in which an apparatus for implementing a function of the terminal is the terminal side device.

The network side device 100 or the terminal side device 200 in FIG. 3 in the embodiments of this application may be implemented by a device, or may be a functional module in a device. This is not specifically limited in the embodiments of this application. It may be understood that the foregoing function may be a network element in a hardware device, a software function running on dedicated hardware, a virtualized function instantiated on a platform (for example, a cloud platform), or a chip system. In the embodiments of this application, the chip system may include a chip, or may include a chip and another discrete component.

Figure 4:
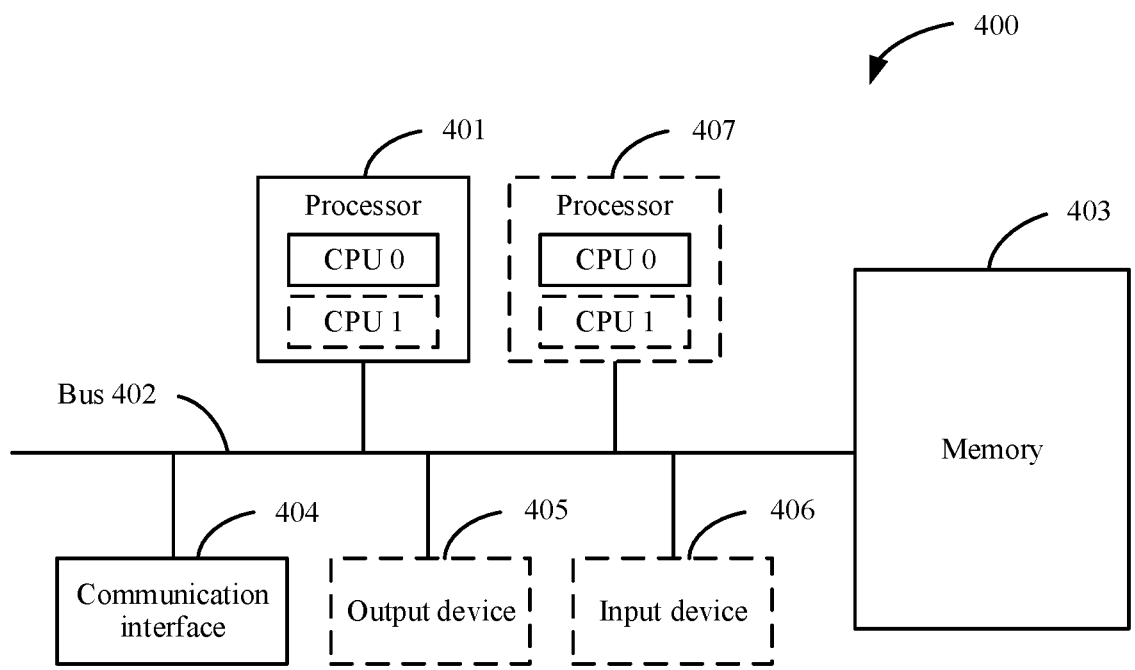
FIG. 4 is a schematic diagram of an internal structure of a terminal side device according to an embodiment of this application.

For example, the apparatus for implementing the function of the terminal side device provided in the embodiments of this application may be implemented by an apparatus 400 in FIG. 4. FIG. 4 is a schematic diagram of a hardware structure of the apparatus 400 according to an embodiment of this application. The apparatus 400 includes at least one processor 401, configured to implement the function of the terminal side device provided in the embodiments of this application. The apparatus 400 may further include a bus 402 and at least one communication interface 404. The apparatus 400 may further include a memory 403.

In the embodiments of this application, the processor may be a central processing unit (CPU), a general purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

The bus 402 may be configured to transmit information between the foregoing components.

The communication interface 404 is configured to communicate with another device or a communication network, for example, an Ethernet, a radio access network (RAN), or a wireless local area network (WLAN). The communication interface 404 may be an interface, a circuit, a transceiver, or another apparatus that can implement communication. This is not limited in this application. The communication interface 404 may be coupled to the processor 401. Coupling in the embodiments of this application may be indirect coupling or a communication connection between apparatuses, units, or modules in an electrical form, a mechanical form, or another form, and is used for information exchange between the apparatuses, the units, or the modules.

In the embodiments of this application, the memory may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in an instruction or data structure form and that can be accessed by a computer. However, the memory is not limited thereto. The memory may exist independently, or may be coupled to the processor, for example, through the bus 402. Alternatively, the memory may be integrated with the processor.

The memory 403 is configured to store program instructions, and the processor 401 may control execution of the program instructions, to implement a method provided in the following embodiments of this application. The processor 401 is configured to invoke and execute the instructions stored in the memory 403, to implement the resource scheduling method provided in the following embodiments of this application.

Optionally, computer-executable instructions in the embodiments of this application may also be referred to as application program code. This is not specifically limited in the embodiments of this application.

Optionally, the memory 403 may be included in the processor 401.

During specific implementation, in an embodiment, the processor 401 may include one or more CPUs, for example, a CPU 0 and a CPU 1 in FIG. 4.

During specific implementation, in an embodiment, the apparatus 400 may include a plurality of processors, for example, the processor 401 and a processor 407 in FIG. 4. Each of these processors may be a single-core (e.g. single-CPU) processor or a multi-core (e.g. multi-CPU) processor. The processor herein may be one or more devices, circuits, and/or processing cores configured to process data (for example, computer program instructions).

During specific implementation, in an embodiment, the apparatus 400 may further include an output device 405 and an input device 406. The output device 405 is coupled to the processor 401, and may display information in a plurality of manners. For example, the output device 405 may be a liquid crystal display (LCD), a light emitting diode (LED) display device, a cathode ray tube (CRT) display device, or a projector. The input device 406 is coupled to the processor 401, and may receive an input from a user in a plurality of manners. For example, the input device 406 may be a mouse, a keyboard, a touchscreen device, or a sensing device.

The apparatus 400 may be a general-purpose device or a special-purpose device. During specific implementation, the terminal side device 400 may be a desktop computer, a portable computer, a network server, a palmtop computer (e.g. personal digital assistant (PDA)), a mobile phone, a tablet computer, a wireless terminal side device, an embedded device, or a device with a structure similar to that in FIG. 4. A type of the apparatus 400 is not limited in the embodiments of this application.

Figure 5:
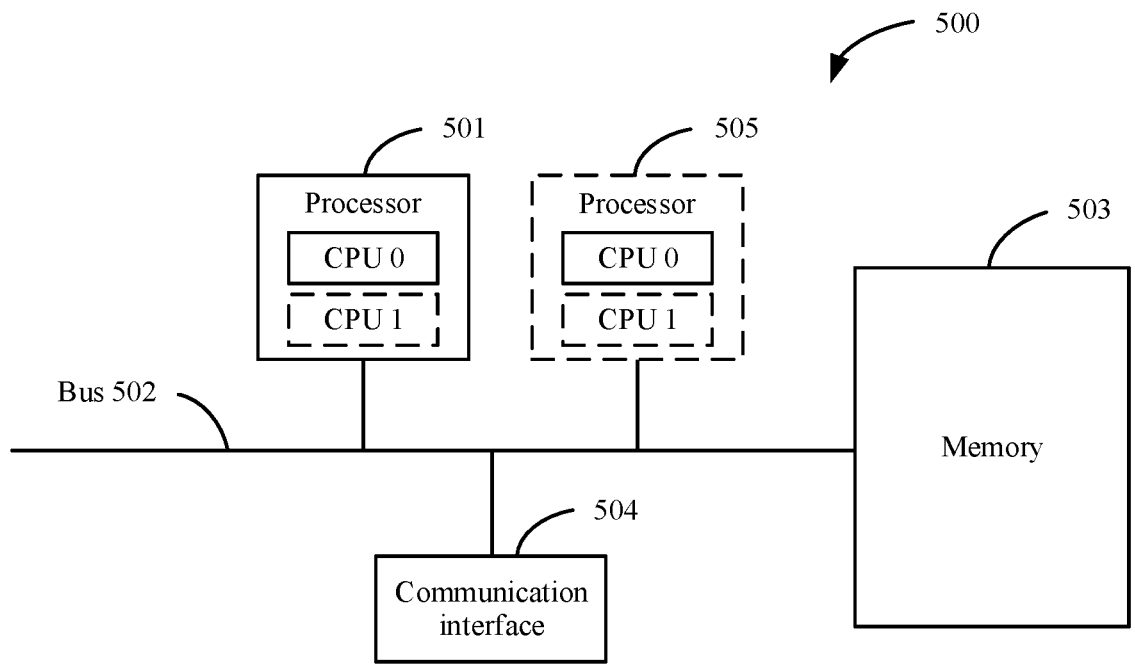
FIG. 5 is a schematic diagram of an internal structure of a network side device according to an embodiment of this application.

For example, the apparatus for implementing the function of the network side device provided in the embodiments of this application may be implemented by an apparatus 500 in FIG. 5. FIG. 5 is a schematic diagram of a hardware structure of the apparatus 500 according to an embodiment of this application. The apparatus 500 includes at least one processor 501, configured to implement the function of the network side device provided in the embodiments of this application. The apparatus 500 may further include a bus 502 and at least one communication interface 504. The apparatus 500 may further include a memory 503.

The bus 502 may be configured to transmit information between the foregoing components.

The communication interface 504 is configured to communicate with another device or a communication network, for example, an Ethernet, a RAN, or a WLAN. The communication interface 504 may be an interface, a circuit, a transceiver, or another apparatus that can implement communication. This is not limited in this application. The communication interface 504 may be coupled to the processor 501.

The memory 503 is configured to store program instructions, and the processor 501 may control execution of the program instructions, to implement the resource scheduling method provided in the following embodiments of this application. For example, the processor 501 is configured to invoke and execute the instructions stored in the memory 503, to implement the resource scheduling method provided in the following embodiments of this application.

Optionally, the memory 503 may be included in the processor 501.

During specific implementation, in an embodiment, the processor 501 may include one or more CPUs, for example, a CPU 0 and a CPU 1 in FIG. 5.

During specific implementation, in an embodiment, the apparatus 500 may include a plurality of processors, for example, the processor 501 and a processor 505 in FIG. 5. Each of these processors may be a single-core processor, or may be a multi-core processor. The processor herein may be one or more devices, circuits, and/or processing cores configured to process data (for example, computer program instructions).

To make descriptions of the following embodiments clear and concise, related concepts or technologies are first briefly described.

Operations related to a buffer of a random access procedure (a random access procedure including four steps) in long term evolution (LTE): When a terminal side device initiates a random access procedure in a serving cell, a MAC entity of the terminal side device clears an MSG3 buffer. If a random access response indicates that the terminal side device succeeds in random access, a to-be-sent MAC PDU is obtained from a multiplexing and assembly entity and stored into the Msg3 buffer. Then, a hybrid automatic repeat request (HARQ) entity obtains the to-be-sent MAC PDU from the MSG3 buffer, and indicates a HARQ process corresponding to the to-be-sent MAC PDU to trigger a new transmission. After an MSG3 is sent, the MAC entity clears a HARQ buffer used to send the MAC PDU in the Msg3 buffer.

Operation of receiving a random access response in LTE: UE receives a configuration of a physical random access channel (PRACH) resource from a network side, where the PRACH resource includes a time-frequency resource configuration. After sending a preamble to a base station on the PRACH resource, the UE needs to receive, within a random access response (RAR) window, scheduling of the base station using physical downlink control channel (PDCCH) signaling. The PDCCH signaling is scrambled by using an RA-RNTI, and a value of the RA-RNTI may be calculated according to a formula (1):

$$RA\text{-}RNTI=1+s\_id+14\times t\_id+14\times 80\times f\_id+14\times 80\times 8\times ul\_carrier\_id \quad \text{formula (1)}$$

s_id is an index number of the 1st symbol of the PRACH resource (0≤s_id<14), t_id is an index number of the $1^{st}$ slot of the PRACH resource in a system frame (0≤t_id<80), f_id is a resource index number of a PUSCH in frequency domain (0≤f_id<8), and ul_carrier_id is an identifier of a carrier for sending the preamble.

In this way, after sending a preamble on a PRACH resource, the UE may calculate a unique RA-RNTI according to the formula (1) by using a time-frequency position of the PRACH resource, and then receive, within a RAR window, an indication of PDCCH signaling scrambled by using the RA-RNTI. In LTE, a start location of the RAR window is the third subframe after a subframe in which the UE sends the preamble.

Figure 6A:
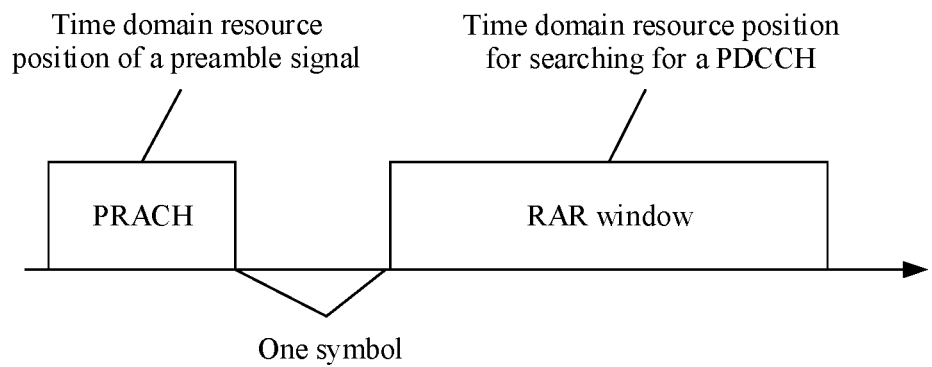
FIG. 6a is a schematic diagram of a RAR window according to an embodiment of this application.

As shown in FIG. 6a, a start location of a RAR window is located after a symbol that is after a PRACH occasion, a type 1 PDCCH may be received within the RAR window, and a control resource set of a search space of a RAR is determined by using downlink control information (DCI) carried on the PDCCH. A length of the RAR window may be indicated by the base station by using radio resource control (RRC) signaling.

Figure 6B:
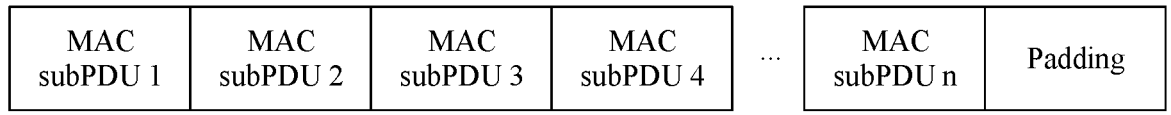
FIG. 6b is a schematic diagram of an existing MAC PDU.
Figure 6C:
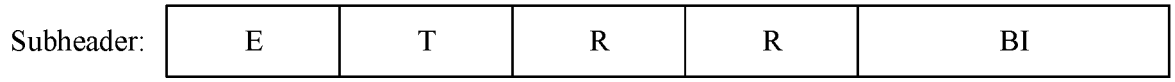
FIG. 6c is a schematic diagram of a subheader of a MAC subPDU according to an embodiment of this application.
Figure 6C:
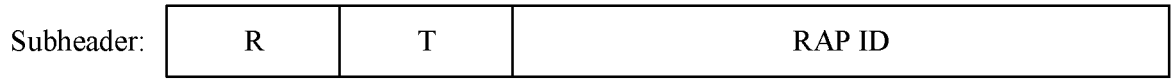
Figure 6D:
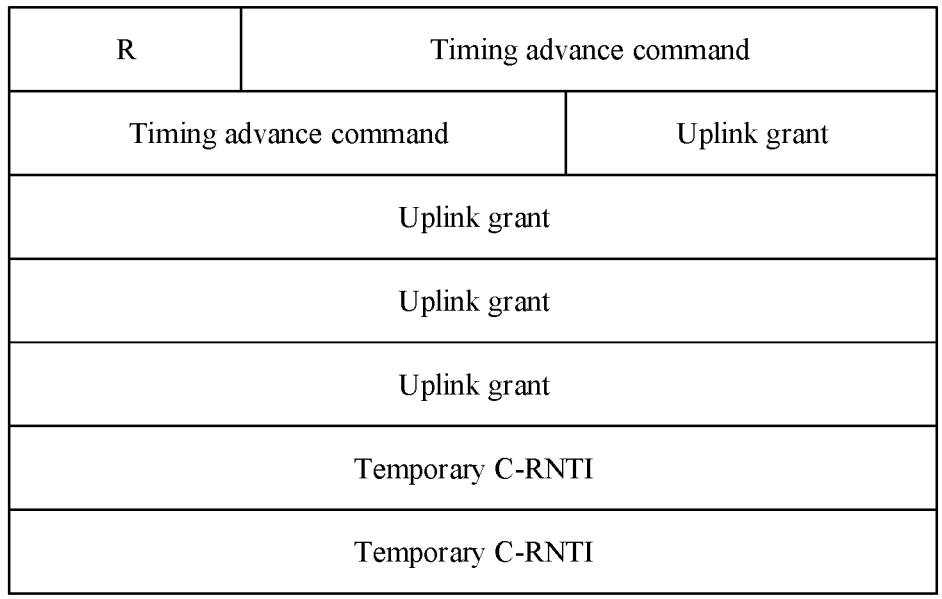
FIG. 6d is a schematic diagram of a MAC SDU according to an embodiment of this application.

As shown in FIG. 6b, a RAR may be included in a MAC PDU, and one MAC PDU may include a plurality of MAC subPDUs. A MAC subPDU may include a subheader and a payload, and the payload may carry the RAR. Alternatively, a MAC subPDU may include only a subheader. As shown in FIG. 6c, a MAC subPDU may include an E field, a T field, an R field, and a BI field, or a MAC subPDU may include an E field, a T field, and a RAP ID field. The E field is used to indicate whether the MAC subPDU including this subheader is the last MAC subPDU in the MAC PDU, the T field indicates whether the MAC subheader includes a random access preamble identifier or backoff indicator information, the R field is a reserved bit, the BI field identifies an overload condition in this cell, and the RAP ID field identifies a random access preamble identifier that has been sent. As shown in FIG. 6d, a MAC service data unit (SDU) may include one or more fields. For example, the MAC SDU includes a field R, a timing advance command, an uplink grant (UL Grant), and a temporary cell radio network identifier (temporary C-RNTI).

In NR, a size of a RAR is fixed at seven bytes, and UE may determine, by using a MAC subheader, a start location of reading a MAC RAR. If the UE detects, in a MAC subheader, that a RAP ID is the same as a preamble ID sent by the UE, the UE reads 7-byte RAR information that is after the MAC subheader.

Figure 1:
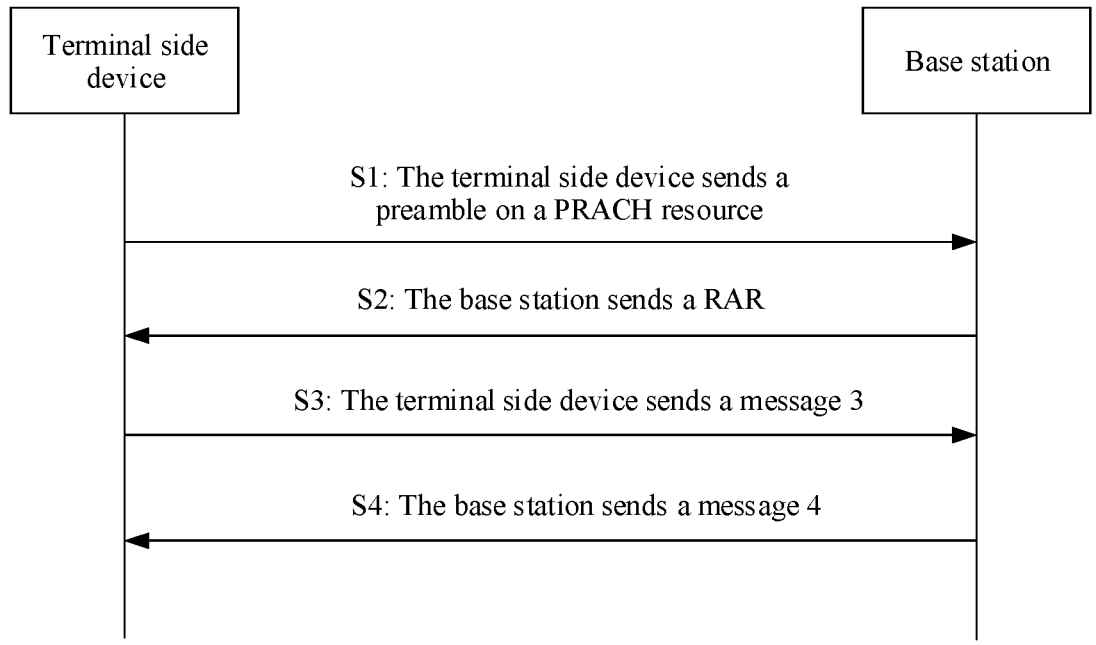
FIG. 1 is a schematic diagram of a four-step random access procedure according to an embodiment of this application.
Figure 2:
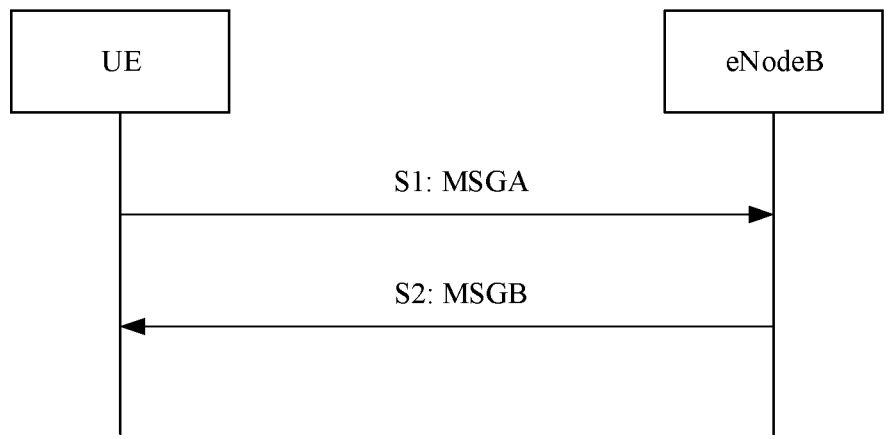
FIG. 2 is a schematic diagram of a two-step random access procedure according to an embodiment of this application.

For a two-step random access procedure, as shown in FIG. 2, a terminal sends a message A, where the message A includes a preamble and uplink data. The terminal side device may determine a random access channel (RACH) resource and a data resource of the two-step random access procedure, send the preamble on the RACH resource, and send the uplink data on the data resource. After sending the message A, the terminal receives a message B. If the terminal verifies that contention resolution information included in the message B is successful, random access succeeds. If a network side fails to decode the message A, the network side may send response information to indicate the UE to fall back to a four-step random access procedure or indicate the UE to continue to perform the two-step random access procedure.

Currently, for a further implementation of a two-step random access solution and how a four-step random access solution is compatible with the two-step random access solution, the following problem exists: Because formats of response messages are different after the UE performs the four-step random access procedure or the two-step random access procedure, how to prevent the terminal side device from performing incorrect parsing needs to be designed.

Based on the random access method provided in this application, the terminal side device may search different search spaces for PDCCHs based on identifiers of the different search spaces, or the terminal side device may detect PDCCHs based on different RNTIs, where downlink control information carried on the PDCCH indicates a resource of the response information, and the terminal side device receives the response information on the resource indicated by the downlink control information; or the terminal side device may identify corresponding response messages based on different MAC PDU formats, so that the terminal side device can quickly identify response messages of different random access procedures, to prevent the terminal side device from performing incorrect parsing.

The following describes the technical solutions in the embodiments of this application with reference to the accompanying drawings in the embodiments of this application. In the descriptions of this application, unless otherwise specified, "at least one" means one or more, and "a plurality of" means two or more. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" are not intended to limit a quantity and an execution sequence, and do not indicate a definite difference either.

For ease of understanding, the following specifically describes, with reference to the accompanying drawings, the random access method provided in the embodiments of this application.

Figure 7:
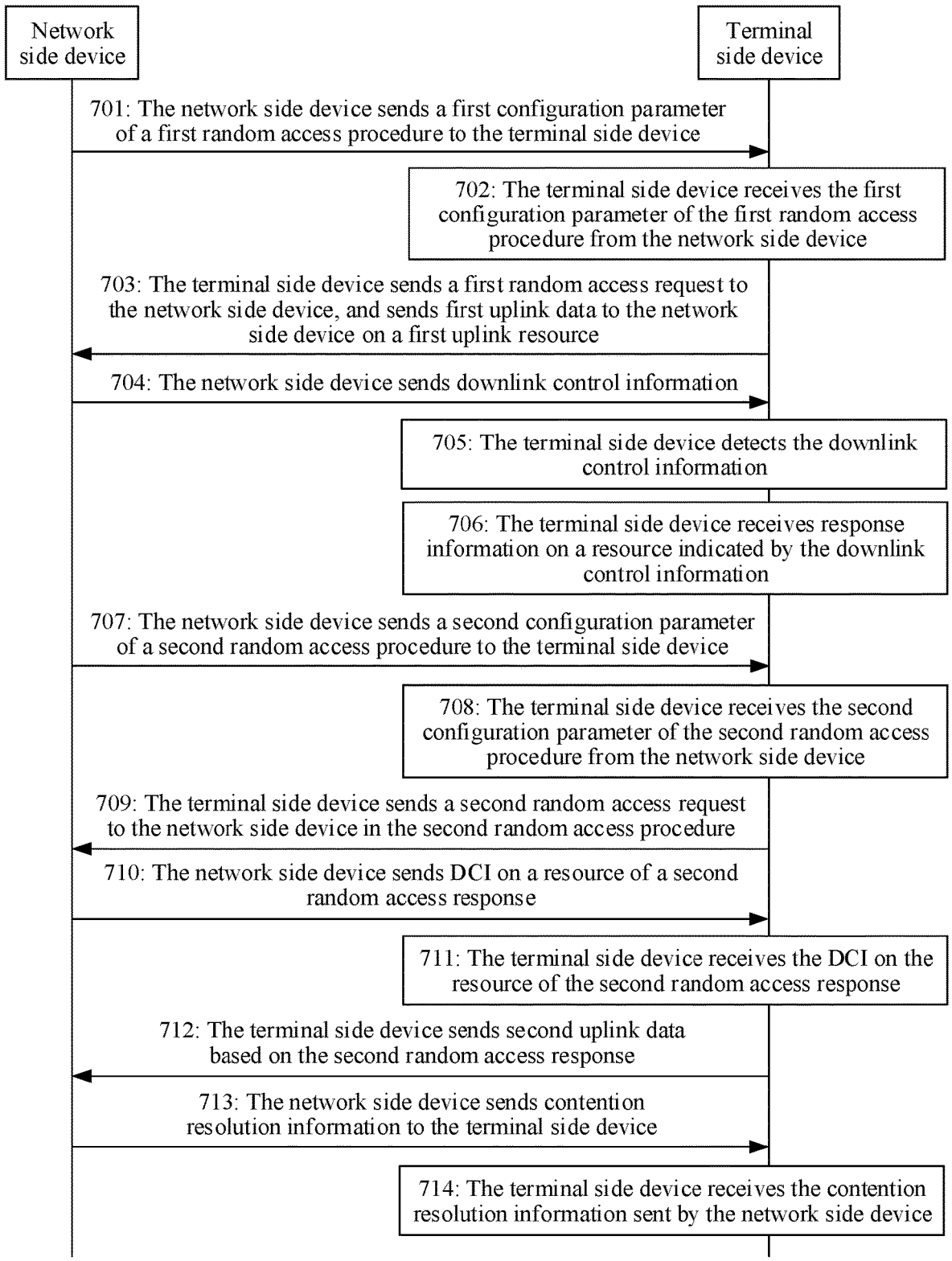
FIG. 7 is a schematic diagram of signal exchange applicable to a random access method according to an embodiment of this application.

As shown in FIG. 7, an embodiment of this application provides a random access method, including the following steps.

701: A network side device sends a first configuration parameter of a first random access procedure to a terminal side device.

The first configuration parameter includes an identifier of a first search space and a configuration of a first uplink resource. Alternatively, the first configuration parameter includes a configuration of a first uplink resource.

702: The terminal side device receives the first configuration parameter of the first random access procedure from the network side device.

The first random access procedure is a procedure in which the terminal side device sends a first random access request, sends first uplink data on the first uplink resource, and receives response information, and the response information is a first random access response to the first random access request or a response to the first uplink data. It may be understood that the first uplink resource is a resource obtained before the random access response. Therefore, the terminal may send the first uplink data before obtaining a resource in the random access response. The response to the first uplink data may include contention resolution information, an acknowledgment (ACK), a negative acknowledgment (negative acknowledge, NACK), or the like.

For example, the first random access procedure may be a random access procedure including two steps, that is, a random access procedure in which the terminal side device sends an MSGA and receives an MSGB.

The first configuration parameter includes the identifier of the first search space and the configuration of the first uplink resource. The identifier of the first search space may be specially allocated to the first random access procedure, in other words, the identifier of the first search space is dedicated to the first random access procedure. The terminal side device may quickly identify a search space of the first random access procedure based on the identifier of the first search space, and further detect downlink control information (DCI) of the first random access procedure in the search space. The first configuration parameter may further include a DCI format, a monitoring slot periodicity, a monitoring slot location, or the like that is associated with the identifier of the first search space.

The first configuration parameter may further include an identifier of a first control resource set, and the first control resource set is a resource set for detecting the downlink control information carried in the first search space. The identifier of the first control resource set is associated with a frequency domain resource and duration of the carried downlink control information.

In other words, the terminal side device may search, based on a time-frequency control resource set indicated by the identifier of the first control resource set, a PDCCH corresponding to the first random access procedure for the DCI. The time-frequency control resource set indicated by the identifier of the first control resource set may include one or more time-frequency resources. The identifier of the first search space is associated with the identifier of the first control resource set.

703: The terminal side device sends the first random access request to the network side device, and sends the first uplink data to the network side device on the first uplink resource.

The first random access request may include a first random access preamble or a first demodulation reference signal (DMRS). It may be understood that both the first random access preamble and the first DMRS may be sent.

The terminal side device may obtain, from a resource configuration message of the first random access procedure, the first uplink resource used to send the first uplink data. The terminal side device selects the first random access preamble or the first DMRS that corresponds to the first random access procedure, and selects a PRACH resource used to send the first random access preamble or the first DMRS. The terminal side device sends the first uplink data on the first uplink resource, and sends the first random access preamble or the first DMRS on the PRACH resource. It may be understood that a DMRS may be sent on a PUSCH resource for sending data.

In a possible design, the terminal side device may obtain the to-be-sent first uplink data from a multiplexing and assembly entity, and store the first uplink data into a first message buffer. The first message buffer is a buffer specific to the first random access procedure. In other words, the first message buffer may be dedicated to the first random access procedure. The first message buffer may also be referred to as an MSGA buffer, and any concept used to identify a message buffer of the first random access procedure complies with a definition of the first message buffer in this specification. This is not limited in this application. Then, the terminal side device may obtain the first uplink data from the first message buffer, store the first uplink data into a HARQ buffer, and indicate a HARQ process to trigger transmission of the first uplink data in the HARQ buffer. It may be understood that if the first message buffer has had a MAC PDU, and this resource is an uplink grant resource of the first random access procedure, a HARQ entity may obtain the MAC PDU from the first message buffer.

Optionally, when determining to initialize the first random access procedure in a serving cell, the terminal side device may clear the first message buffer and/or a second message buffer, to clear data in a previous random access procedure that is left in the first message buffer and the second message buffer. In this way, the first message buffer may carry the first uplink data of the first random access procedure, and the second message buffer may carry second uplink data of a second random access procedure.

It should be noted that the first uplink data may be an RRC connection establishment request, an RRC connection resume request, or an RRC reestablishment request message. The first uplink data may alternatively be uplink service data, or signaling generated at a MAC layer, a radio link control (RLC) layer, a packet data convergence protocol (PDCP) layer, or a non-access stratum (NAS) layer. The first uplink data may alternatively be a combination of one or more of the foregoing types of data.

When the first random access procedure fails, or when the second message buffer has no uplink data and the first message buffer has uplink data, the second message buffer is specific to the second random access procedure. The terminal side device re-initiates the second random access procedure, and obtains the second uplink data from the first message buffer. In other words, when falling back from the first random access procedure to the second random access procedure, the terminal side device may obtain the uplink data from the first message buffer, and does not need to regenerate the uplink data. This improves data transmission efficiency. The second random access procedure is a procedure in which the terminal side device sends a second random access request, receives a second random access response to the second random access request, and sends the second uplink data based on the second random access response. For example, the second random access procedure is a random access procedure including four steps, that is, a random access procedure in which the terminal side device interacts with the network side device by using an MSG1 to an MSG4.

When the first random access procedure fails, or when the second message buffer has no uplink data and the first message buffer has uplink data, the second message buffer is a buffer used for the second random access procedure, and the method further includes: The terminal side device stores the uplink data in the first message buffer into the second message buffer, and the terminal side device obtains the second uplink data from the second message buffer in the second random access procedure. In other words, when falling back from the first random access procedure to the second random access procedure, the terminal side device may duplicate the uplink data in the first message buffer to the second message buffer, and obtain the uplink data from the second message buffer, instead of regenerating the uplink data. This improves data transmission efficiency.

In a possible design, the terminal side device may store the first uplink data into the first message buffer and the second message buffer. In other words, when initiating the first random access procedure, the terminal side device may store the first uplink data into the first message buffer and the second message buffer. If the first random access procedure initiated by the terminal side device fails, and the terminal side device needs to fall back to the second random access procedure, the terminal side device may directly obtain the uplink data from the second message buffer instead of regenerating the uplink data. This improves the data transmission efficiency.

In a possible design, the terminal side device may obtain the to-be-sent first uplink data from the multiplexing and assembly entity in the first random access procedure, and store the first uplink data into a third message buffer (for example, a RACH buffer). Then, the terminal side device obtains the first uplink data from the third message buffer, stores the first uplink data into the HARQ buffer, and indicates the HARQ process to trigger transmission of the first uplink data in the HARQ buffer. The third message buffer is a buffer shared by the first random access procedure and the second random access procedure.

Optionally, when determining to initialize the first random access procedure in the serving cell, the terminal side device may clear the third message buffer, to clear data in the previous random access procedure that is left in the third message buffer. In this way, the third message buffer may carry the first uplink data of the first random access procedure and the second uplink data of the second random access procedure.

In a possible design, after indicating the HARQ process to trigger the transmission of the first uplink data in the HARQ buffer, the terminal side device may temporarily retain the first uplink data in the HARQ buffer. If the first random access procedure fails, the terminal side device may retransmit the first uplink data in the HARQ buffer based on a first uplink grant, or reconstruct and then send the first uplink data in the HARQ buffer. In a conventional technology, after data in a HARQ buffer is transmitted, the HARQ buffer is cleared in a timely manner. However, in this application, the first uplink data in the HARQ buffer may be temporarily retained, to avoid a case in which the first uplink data needs to be re-obtained from a message buffer (for example, the first message buffer) or the multiplexing and assembling entity after the first random access procedure fails, thereby improving the data transmission efficiency.

In all the foregoing designs, if a size of a resource used to send uplink data in the first random access procedure or the second random access procedure cannot match a size of a MAC PDU obtained from the message buffer, the multiplexing and assembly entity is indicated to perform processing. For example, a part or all of MAC SDUs are obtained from the MAC PDU, MAC subPDUs are generated for these MAC SDUs, and then a MAC PDU is formed.

When the terminal side device initializes the first random access procedure, the terminal side device may set a first counter to an initial value, for example, may set a value of the first counter to 0 or 1. The first counter is specific to the first random access procedure, in other words, the first counter is dedicated to the first random access procedure. The first counter may be a first random access preamble sending counter (PREAMBLE_TRANSMISSION_COUNTER). If contention resolution in the first random access procedure fails, the terminal side device increases the count value of the first counter by 1. That contention resolution in the first random access procedure fails may be that when the PDCCH detection window expires, a response message of the first random access procedure that is received by the terminal side device does not match the first random access preamble sent by the terminal side device, or the terminal side device does not receive a response message of the first random access procedure, or the terminal side device does not receive a PDCCH scheduled by using a C-RNTI of the terminal, or a contention resolution information field of a received response message of the first random access procedure fails to be verified. If the first counter reaches a configured maximum value, the terminal side device indicates, to a higher layer (for example, an RRC layer), that the first random access procedure fails. The maximum value of the first counter may be (preambleTransMax) or (preambleTransMax+1).

Alternatively, when the terminal side device initializes the first random access procedure, the terminal side device sets a second counter to an initial value, where the second counter is a counter shared by the first random access procedure and the second random access procedure. For a related operation of the second counter, refer to that of the first counter. Details are not described herein. It may be understood that if contention resolution in the first random access procedure or the second random access procedure fails, the terminal side device increases a count value of the shared counter by 1.

Optionally, the terminal may count a quantity of times for which the first random access procedure fails, and report the quantity of times to the network side device by using higher layer signaling. For example, the quantity of times is reported to the network side device by using an assistance information reporting message. It may be understood that the terminal may count a quantity of times for which the second random access procedure fails, and report the quantity of times to the network side device by using higher layer signaling. The quantity of times for which the first random access procedure fails and the quantity of times for which the second random access procedure fails may be separately counted and reported.

In addition, when the terminal side device initializes the first random access procedure, the terminal side device may set a first power ramping counter to an initial value (for example, 1). The first power ramping counter may be specific to the first random access procedure, in other words, the first power ramping counter may be dedicated to the first random access procedure. If the terminal side device needs to (re)send the first random access request or the first uplink data, and a synchronization signal block (SSB) does not change, the terminal side device increases a count value of the first power ramping counter by 1.

Alternatively, when the terminal side device initializes the first random access procedure, the terminal side device sets a second power ramping counter to an initial value, where the second power ramping counter is a power ramping counter shared by the first random access procedure and the second random access procedure. If the terminal side device initiates the first random access procedure again or initiates the second random access procedure, and an SSB does not change, the terminal side device increases a count value of the second power ramping counter by 1. For a related operation of the second power ramping counter, refer to that of the first power ramping counter. Details are not described herein. It may be understood that, if the second random access procedure is initiated, and the synchronization signal block does not change, the count value of the second power ramping counter is increased by 1.

704: The network side device sends the downlink control information.

The downlink control information is used to indicate a resource of the response information of the first random access procedure.

705: The terminal side device detects the downlink control information.

Figure 8:
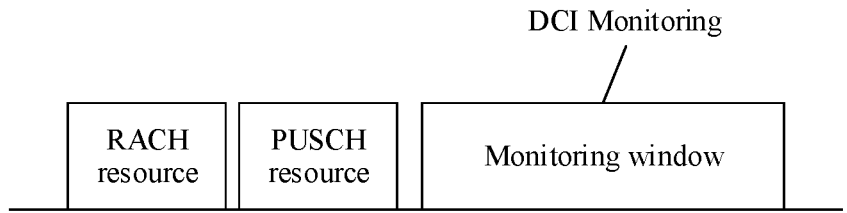
FIG. 8 is a schematic diagram of a monitoring window according to an embodiment of this application.

The terminal side device searches, for the DCI, a time-frequency resource of the PDCCH corresponding to the first random access procedure. As shown in FIG. 8, after sending a first message on a PUSCH resource, the terminal side device starts a detection window for receiving the PDCCH corresponding to the first random access procedure. The window may be a RAR window or a specific window timer configured over the network side device.

A start occasion of the window may be one of the following: (1) a symbol that is after the last symbol of a PRACH occasion for sending a preamble and that is in an earliest control resource set of a type 1 PDCCH search space used to receive a RAR; (2) a symbol that is after the last symbol of a PUSCH occasion for sending data and that is in an earliest control resource set of a type 1 PDCCH search space used to receive the MsgB; and (3) a start occasion after the last symbol of a PUSCH resource for sending data.

In a possible design, the terminal side device detects, based on the identifier of the first search space, the downlink control information carried in the first search space, where the downlink control information indicates the resource of the response information.

In a possible design, the terminal side device detects, based on a first RNTI, the downlink control information corresponding to the first random access procedure, where the downlink control information indicates the resource of the response information. The first RNTI is a scrambling identifier of the downlink control information corresponding to the first random access procedure. That is, the DCI on the PDCCH corresponding to the first random access procedure may be in a first DCI format (for example, DCI formats 0_0 and 1_0 or another format) scrambled by using the first RNTI. The first RNTI may be specially allocated to the first random access procedure, in other words, the first RNTI is dedicated to the first random access procedure. The terminal side device may descramble, by using the first RNTI, the PDCCH corresponding to the first random access procedure. It may be understood that the first RNTI is different from an RA-RNTI defined in a protocol.

The first RNTI is notified by the network side device by using a dedicated message or a common message or is predefined. For example, the first RNTI may be included in the resource configuration message of the first random access procedure. The first RNTI may be allocated to UE through a higher layer or a physical layer. A plurality of UEs may share one first RNTI. A terminal side device may correspond to different first RNTIs in an idle state, an inactive state, and a connected state. There is a correspondence between the first RNTI and a resource for sending the first uplink data. The first RNTI may be associated with one or more PUSCH resources indicated by one or more uplink grant configurations. After sending the first uplink data on the first uplink grant, the terminal side device receives the DCI on the PDCCH by using the first RNTI associated with the first uplink grant.

In a possible design, the terminal side device detects, based on the identifier of the first search space, the downlink control information carried in the first search space, and descrambles, based on the first RNTI, the downlink control information corresponding to the first random access procedure.

706: The terminal side device receives the response information on the resource indicated by the downlink control information.

That is, the terminal side device receives the response information on the resource that is of the response information and that is indicated by the downlink control information.

After receiving and descrambling the DCI corresponding to the first random access procedure, the terminal side device may receive a MAC PDU on a physical downlink shared channel (PDSCH) indicated by the DCI, where the MAC PDU includes a first MAC subPDU corresponding to the first random access procedure, and the first MAC subPDU includes the response information.

Optionally, the first MAC subPDU further includes an identifier of the first random access request. For example, a MAC subheader in the first MAC subPDU may include the identifier (for example, a preamble ID) of the first random access request.

In a possible design, the MAC PDU may include one or more MAC subPDUs. The MAC PDU may include not only the first MAC subPDU corresponding to the first random access procedure, but also a second MAC subPDU corresponding to the second random access procedure. The second MAC subPDU includes the second random access response in the second random access procedure. The second random access procedure is the procedure in which the terminal side device sends the second random access request, receives the second random access response to the second random access request, and sends the second uplink data based on the second random access response.

Optionally, the second MAC subPDU further includes an identifier of the second random access request. For example, a MAC subheader in the second MAC subPDU may include the identifier of the second random access request. A payload in the second MAC subPDU is a RAR field.

In a possible design, in the MAC PDU, the second MAC subPDU is located before the first MAC subPDU.

Figure 9:
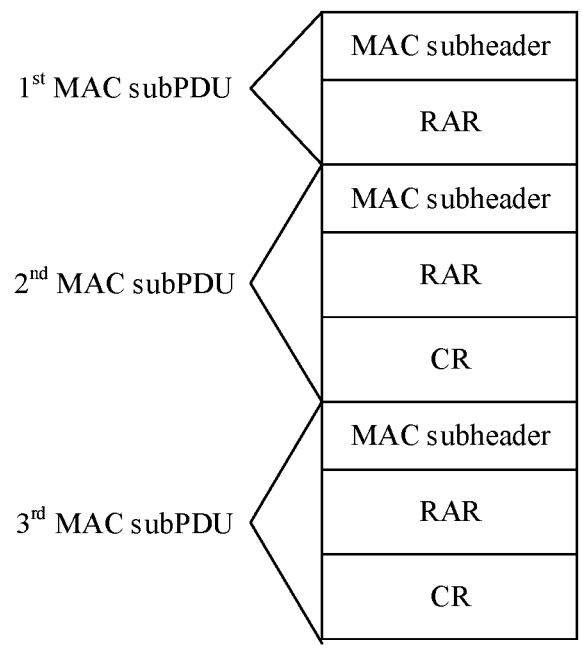
FIG. 9 is a schematic diagram of a MAC PDU according to an embodiment of this application.

For example, as shown in FIG. 9, a first MAC PDU may include three MAC subPDUs, the 1" MAC subPDU may carry a response of a second random access procedure initiated by a first terminal side device, and the 2nd MAC subPDU may carry a response of a first random access procedure initiated by a second terminal side device. The 3rd MAC subPDU may carry a response of a first random access procedure initiated by a third terminal side device. Optionally, a MAC subheader of the 1" MAC subPDU carries a logical channel identifier, and the identifier indicates that a payload (namely, a RAR field) after the MAC subheader is the response for the second random access procedure initiated by the first terminal side device. A MAC subheader of the 2nd MAC subPDU carries a logical channel identifier, and the identifier indicates that a payload (namely, a RAR field and a CR field) after the MAC subheader is the response for the first random access procedure initiated by the second terminal side device. A MAC subheader of the 3rd MAC subPDU carries a logical channel identifier, and the identifier indicates that a payload after the MAC subheader is the response for the first random access procedure initiated by the third terminal side device. Optionally, each MAC subheader carries length field information or length indication bit information, and the information indicates a length of the payload after the MAC subheader, to support a variable payload length.

Figure 10:
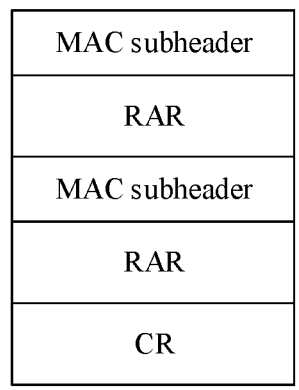
FIG. 10 is a schematic diagram of another MAC PDU according to an embodiment of this application.

For example, as shown in FIG. 10, a first MAC PDU may include two MAC subPDUs. The $1^{st}$ MAC subPDU includes one MAC subheader and one RAR field. The 2nd MAC subPDU includes a CR field, one MAC subheader, and one RAR field. There may be one or more CR fields (one CR field is used as an example in the figure).

Figure 11:
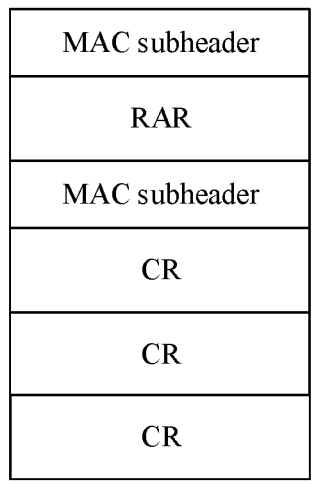
FIG. 11 is a schematic diagram of still another MAC PDU according to an embodiment of this application.

For example, as shown in FIG. 11, a first MAC PDU may include two MAC subPDUs. The $1^{st}$ MAC subPDU includes one MAC subheader and one RAR field. The $2^{nd}$ MAC subPDU includes a CR field and one MAC subheader. There may be one or more CR fields.

Figure 12:
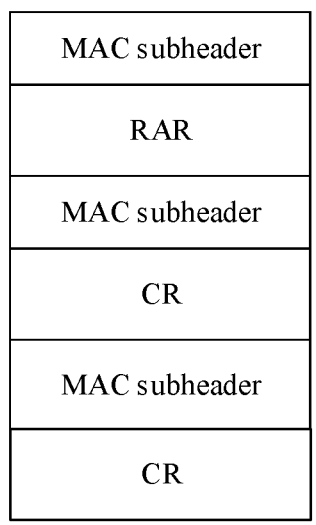
FIG. 12 is a schematic diagram of still another MAC PDU according to an embodiment of this application.

For example, as shown in FIG. 12, a first MAC PDU may include three MAC subPDUs. The $1^{st}$ MAC subPDU includes one MAC subheader and one RAR field. The $2^{nd}$ MAC subPDU includes one MAC subheader and one CR field. The $3^{rd}$ MAC subPDU includes one MAC subheader and one CR field.

Figure 13:
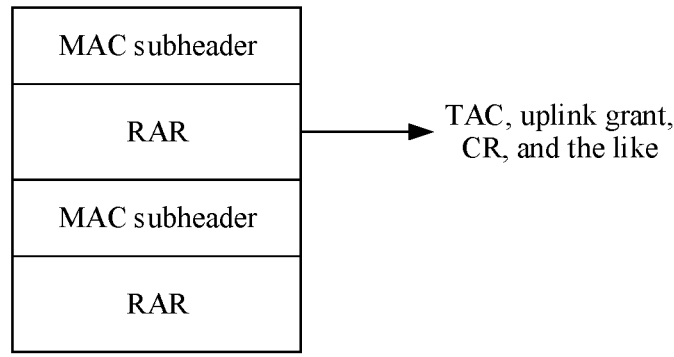
FIG. 13 is a schematic diagram of still another MAC PDU according to an embodiment of this application.

For example, as shown in FIG. 13, a first MAC PDU may include two MAC subPDUs. The $1^{st}$ MAC subPDU includes one MAC subheader and one enhanced RAR field. The $2^{nd}$ MAC subPDU includes one MAC subheader and an enhanced RAR field. The enhanced RAR field includes at least one or more of the following: a timing adjustment field, an uplink grant field, a temporary cell radio network temporary identifier field, and a CR field.

For example, a first MAC PDU may include two MAC subPDUs. The $1^{st}$ MAC subPDU includes one MAC subheader, one RAR field, and a CR field. The second MAC subPDU includes one MAC subheader, a RAR field, and a CR field.

In a possible design, the Pr MAC subPDU includes one MAC subheader and one or more CR fields.

In a possible design, a payload payload or the subheader subhead in the first MAC subPDU indicates whether a contention resolution information field exists. When the contention resolution information field exists, the first MAC subPDU further includes one or more contention resolution information fields. In other words, CR fields in responses for first random access procedures initiated by a plurality of terminal side devices may be cascaded in the first MAC subPDU. Optionally, the first MAC subPDU may be the last MAC subPDU in the MAC PDU. For example, one R bit of the MAC payload in the RAR is used to indicate whether the CR field exists. For example, R=0 indicates that the CR field does not exist, and R=1 indicates that the CR field exists. The CR field may be located before, in, or after the RAR field.

In a possible design, the subheader of the first MAC subPDU carries a logical channel identifier, and the logical channel identifier indicates that the first MAC subPDU includes only the contention resolution information field. It may be understood that there is one or more contention resolution information fields. Optionally, the subheader of the first MAC subPDU indicates a quantity of carried contention resolution information fields.

In the present invention, information in the contention resolution information field may be a part or all of terminal identifiers of the terminals, or may be a part or all of uplink data. Optionally, the MAC subheader carries the logical channel identifier, and the logical channel identifier indicates that the payload is a format of a MAC PDU or a MAC subPDU of the foregoing first random access (for example, a two-step random access) response.

In a possible design, the terminal determines the format of the MAC PDU or the MAC subPDU of the first random access (for example, the two-step random access) response based on the identifier that is of the first random access request and that is in a first MAC subheader. The identifier of the first random access request corresponds to the format of the MAC PDU or the MAC subPDU of the foregoing two-step random access response in the present invention, and the identifier of the second random access request corresponds to a format of a MAC PDU or a MAC subPDU of an existing four-step random access response.

Figure 14:
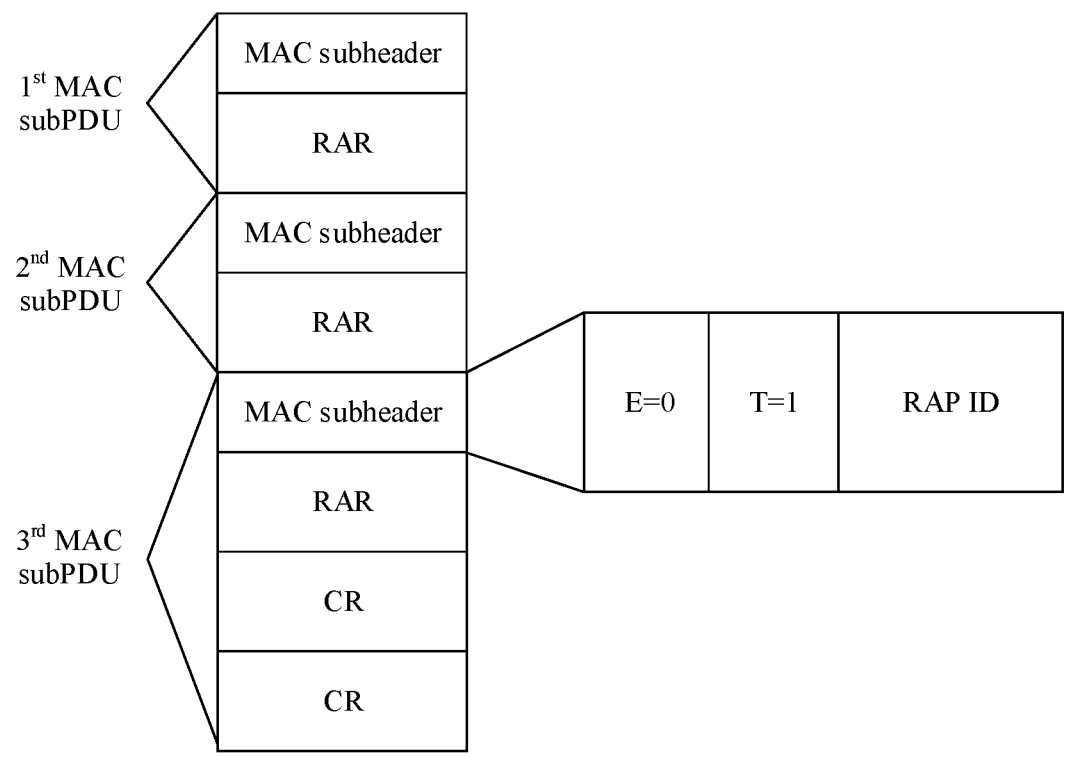
FIG. 14 is a schematic diagram of still another MAC PDU according to an embodiment of this application.

For example, as shown in FIG. 14, an example in which a MAC PDU includes three MAC subPDUs is used. The first MAC subPDU may be the last MAC subPDU (namely, the $3^{rd}$ MAC subPDU), and E=0 in a MAC subheader of the $3^{rd}$ MAC subPDU may be used to indicate that there may be a CR field after a RAR field of the last MAC subPDU. By default, the terminal side device reads CR information by using a fixed bit size (for example, 48 bits).

For an E bit of a MAC subheader of an existing random access response, 0 indicates that a MAC subPDU including the MAC subheader is the last MAC subPDU of this MAC PDU. In the present invention, the terminal determines, based on a size of the MAC PDU, whether the CR field exists. In this manner, padding instead of the CR field may be after the MAC subPDU. In a possible design, indication information is added to the MAC subheader. When E=0, it indicates that the CR field exists after the last MAC subPDU. Optionally, a quantity of CR fields that exist or a length of all CR fields may be indicated. In a possible design, in a possible design, indication information is added to the MAC subheader. When E=0, it indicates that a MAC subPDU including the CR field exists after the last MAC subPDU. Optionally, a quantity of MAC subPDUs including the CR fields or a length of all MAC subPDUs including the CR fields may be indicated.

In a possible design, the MAC PDU may include one or more MAC subPDUs. The RAR field and the CR field are not in a same MAC PDU. The MAC PDU includes only the first MAC subPDU. In this case, the first MAC subPDU includes the first MAC subheader and one or more CR fields. The MAC PDU does not include the RAR field. The MAC PDU includes only the second MAC subPDU, and the second MAC subPDU includes a second MAC subheader and the RAR field. The MAC PDU does not include the CR field.

707: The network side device sends a second configuration parameter of the second random access procedure to the terminal side device.

The second configuration parameter may include an identifier of a second search space and an uplink grant of the second random access procedure. Alternatively, the second configuration parameter includes an uplink grant of the second random access procedure.

708: The terminal side device receives the second configuration parameter of the second random access procedure from the network side device.

The second random access procedure is the procedure in which the terminal side device sends the second random access request, receives the second random access response to the second random access request, and sends the second uplink data based on the second random access response.

For example, the second random access procedure is the random access procedure including four steps, that is, the random access procedure in which the terminal side device interacts with the network side device by using the MSG1 to the MSG4.

The second configuration parameter includes the identifier of the second search space, and the identifier of the second search space is different from the identifier of the first search space. The second search space may be used to carry downlink control information indicating a resource of the second random access response. The terminal side device may identify a search space of the second random access procedure based on the identifier of the second search space, and further detect the DCI of the second random access procedure in the search space.

The second configuration parameter may further include an identifier of a second control resource set, and the second control resource set is a resource set for detecting the downlink control information carried in the second search space. In other words, the terminal side device may search, for the DCI corresponding to the second random access procedure, a time-frequency control resource set indicated by the identifier of the second control resource set.

709: The terminal side device sends the second random access request to the network side device in the second random access procedure.

The second random access request may include a second random access preamble of the second random access procedure. The terminal side device sends the second random access preamble to the network side device on a selected PRACH resource.

710: The network side device sends the DCI on the resource of the second random access response.

The downlink control information indicates the resource of the second random access response.

711: The terminal side device receives the DCI on the resource of the second random access response.

In a possible design, the terminal side device receives, based on the identifier of the second search space, a PDCCH corresponding to the second random access procedure. Refer to the descriptions in step 706. The identifier of the second search space includes the identifier of the second control resource set, and the terminal side device may search, for the PDCCH corresponding to the second random access procedure, the time-frequency control resource set indicated by the identifier of the second control resource set.

It should be noted that the identifier of the first search space may be different from the identifier of the second search space. Specifically, the identifier of the first search space may be specially allocated to the first random access procedure, in other words, the identifier of the first search space is dedicated to the first random access procedure. The identifier of the second search space may be specially allocated to the second random access procedure, in other words, the identifier of the second search space is dedicated to the second random access procedure. In this way, if the terminal side device initiates the first random access procedure (namely, the random access procedure including two steps), the terminal side device may receive the PDCCH based on the identifier of the first search space. If the terminal side device initiates the second random access procedure (namely, the random access procedure including four steps), the terminal side device may receive the PDCCH based on the identifier of the second search space. Therefore, the terminal side device may quickly identify or distinguish between PDCCHs of different random access procedures based on different identifiers of search spaces, to prevent the terminal side device from incorrectly parsing response messages of different random access procedures.

The terminal side device detects, based on a second RNTI, the downlink control information corresponding to the second random access procedure, where the downlink control information indicates the resource of the second random access response, and the second RNTI is a scrambling identifier of the downlink control information corresponding to the second random access procedure.

In a possible design, the terminal side device receives the PDCCH that corresponds to the second random access procedure and that is scrambled by using the second RNTI. That is, the DCI on the PDCCH corresponding to the second random access procedure may be in a second DCI format (for example, DCI formats 0_0 and 1_0 or another format) scrambled by using the second RNTI. The terminal side device may descramble, by using the second RNTI, the PDCCH corresponding to the second random access procedure.

It should be noted that the first RNTI may be different from the second RNTI. Specifically, the first RNTI may be specially allocated to the first random access procedure, in other words, the first RNTI is dedicated to the first random access procedure. The second RNTI may be specially allocated to the second random access procedure, in other words, the second RNTI is dedicated to the second random access procedure. In this way, if the terminal side device initiates the first random access procedure (namely, the random access procedure including two steps), the terminal side device may descramble the PDCCH based on the first RNTI. If the terminal side device initiates the second random access procedure (namely, the random access procedure including four steps), the terminal side device may descramble the PDCCH based on the second RNTI. Therefore, the terminal side device may quickly identify or distinguish between PDCCHs of different random access procedures based on different RNTIs, to prevent the terminal side device from incorrectly parsing response messages of different random access procedures.

In a possible design, the terminal side device receives, based on the identifier of the first search space, the PDCCH that corresponds to the first random access procedure and that is scrambled by using the first RNTI. The terminal side device may quickly identify or distinguish between PDCCHs of different random access procedures based on different identifiers of search spaces and different RNTIs, to prevent the terminal side device from incorrectly parsing response messages of different random access procedures.

712: The terminal side device sends the second uplink data based on the second random access response.

The terminal side device receives response information of the second random access preamble based on scheduling information of the PDCCH corresponding to the second random access procedure. After receiving and descrambling the PDCCH corresponding to the second random access procedure, the terminal side device may obtain the DCI from a PDSCH indicated by the scheduling information of the PDCCH, where the DCI indicates the resource of the second random access response.

Then, the terminal side device may obtain the second uplink data from the second message buffer, store the second uplink data into the HARQ buffer, and indicate the HARQ process to trigger transmission of the second uplink data in the HARQ buffer. The second uplink data may be uplink service and/or signaling data.

Optionally, when determining to initialize the second random access procedure in the serving cell, the terminal side device may clear the second message buffer.

When the second random access procedure fails, or when the first message buffer has no uplink data and the second message buffer has uplink data, the terminal side device re-initiates the first random access procedure, and obtains the uplink data from the second message buffer. In other words, when falling back from the second random access procedure to the first random access procedure, the terminal side device may obtain the uplink data from the second message buffer, and does not need to regenerate the uplink data. This improves the data transmission efficiency.

In a possible design, the terminal side device may store the second uplink data into the first message buffer and the second message buffer. In other words, when initiating the second random access procedure, the terminal side device may store the first uplink data into the first message buffer and the second message buffer. If the second random access procedure initiated by the terminal side device fails, the first random access procedure is performed, and the uplink data may be directly obtained from the first message buffer instead of being regenerated, thereby improving the data transmission efficiency.

In a possible design, the terminal side device obtains the second uplink data from the third message buffer, stores the second uplink data into the HARQ buffer, and indicates the HARQ process to trigger transmission of the second uplink data in the HARQ buffer. The third message buffer is the buffer shared by the first random access procedure and the second random access procedure.

If a size of a sending resource of the terminal side device does not match a size of data obtained from a buffer, the terminal side device may reassemble the data obtained from the buffer into a MAC PDU. Refer to the foregoing related descriptions, and details are not described herein again.

Optionally, when determining to initialize the second random access procedure in the serving cell, the terminal side device may clear the third message buffer.

When the terminal side device initializes the second random access procedure, the terminal side device may set a third counter to an initial value, for example, may set a value of the third counter to 0 or 1. The third counter is specific to the second random access procedure. The third counter may be a third random access preamble sending counter (PREAMBLE_TRANSMISSION_COUNTER). If contention resolution in the second random access procedure fails, the terminal side device increases the count value of the third counter by 1. If the third counter reaches a configured maximum value, the terminal side device indicates, to the higher layer (for example, the RRC layer), that the second random access procedure fails. The terminal may count the quantity of times for which the second random access procedure fails, and report the quantity of times to the network side device.

Alternatively, when the terminal side device initializes the second random access procedure, the terminal side device sets the second counter to the initial value, where the second counter is the counter shared by the first random access procedure and the second random access procedure.

In addition, when the terminal side device initializes the second random access procedure, the terminal side device may set a third power ramping counter to an initial value (for example, 1). The third power ramping counter may be specific to the second random access procedure, in other words, the third power ramping counter may be dedicated to the second random access procedure. If the terminal side device needs to (re)send the second random access request or the second uplink data, and the synchronization signal block does not change, the terminal side device increases a count value of the third power ramping counter by 1.

Alternatively, when the terminal side device initializes the second random access procedure, the terminal side device sets the second power ramping counter to the initial value, where the second power ramping counter is the power ramping counter shared by the first random access procedure and the second random access procedure. It may be understood that, if the first random access procedure and the second random access procedure are initiated, and the synchronization signal block does not change, the count value of the secondpower ramping counter is increased by 1.

713: The network side device sends contention resolution information to the terminal side device The contention resolution information may be included in the Msg4.

714: The terminal side device receives the contention resolution information sent by the network side device.

The contention resolution information corresponding to the second random access procedure may be included in the Msg4, and the terminal side device may access the network side device (for example, an eNodeB) based on the contention resolution information.

It should be noted that there is no definite execution sequence among step 701 to step 714. An execution sequence among the steps is not specifically limited in this embodiment.

An embodiment of this application further provides a random access method, including the following steps.

S101: When a terminal side device initializes a first random access procedure, the terminal side device sets a first counter to an initial value, where the first counter is specific to the first random access procedure. Alternatively, when a terminal side device initializes a first random access procedure, the terminal side device sets a second counter to an initial value, where the second counter is a counter shared by the first random access procedure and a second random access procedure.

When the terminal side device initializes the first random access procedure, the terminal side device may set the first counter to the initial value, for example, may set a value of the first counter to 0 or 1. The first counter is specific to the first random access procedure, in other words, the first counter is dedicated to the first random access procedure. The first counter may be a first random access preamble sending counter (PREAMBLE_TRANSMISSION_COUNTER). If contention resolution in the first random access procedure fails, the terminal side device increases the count value of the first counter by 1. That contention resolution in the first random access procedure fails may be that when the PDCCH detection window expires, a response message of the first random access procedure that is received by the terminal side device does not match a first random access preamble sent by the terminal side device, or the terminal side device does not receive a response message of the first random access procedure, or the terminal side device does not receive a PDCCH scheduled by using a C-RNTI of the terminal, or a contention resolution information field of a received response message of the first random access procedure fails to be verified. If the first counter reaches a configured maximum value, the terminal side device indicates, to a higher layer (for example, an RRC layer), that the first random access procedure fails. The maximum value of the first counter may be (preambleTransMax) or (preambleTransMax+1).

Alternatively, when the terminal side device initializes the first random access procedure, the terminal side device sets the second counter to the initial value, where the second counter is the counter shared by the first random access procedure and the second random access procedure. For a related operation of the second counter, refer to that of the first counter. Details are not described herein. It may be understood that if contention resolution in the first random access procedure or the second random access procedure fails, the terminal side device increases a count value of the shared counter by 1.

Optionally, the terminal may count a quantity of times for which the first random access procedure fails, and report the quantity of times to the network side device by using higher layer signaling. For example, the quantity of times is reported to the network side device by using an assistance information reporting message. It may be understood that the terminal may count a quantity of times for which the second random access procedure fails, and report the quantity of times to the network side device by using higher layer signaling. The quantity of times for which the first random access procedure fails and the quantity of times for which the second random access procedure fails may be separately counted and reported.

For S102 to S115, refer to steps 701 to 714. Details are not described herein.

In the foregoing embodiments provided in this application, the methods provided in the embodiments of this application are separately described from perspectives of the terminal side device, the network side device, and interaction between the terminal side device and the network side device. To implement functions in the methods provided in the foregoing embodiments of this application, the terminal side device and the network side device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 15:
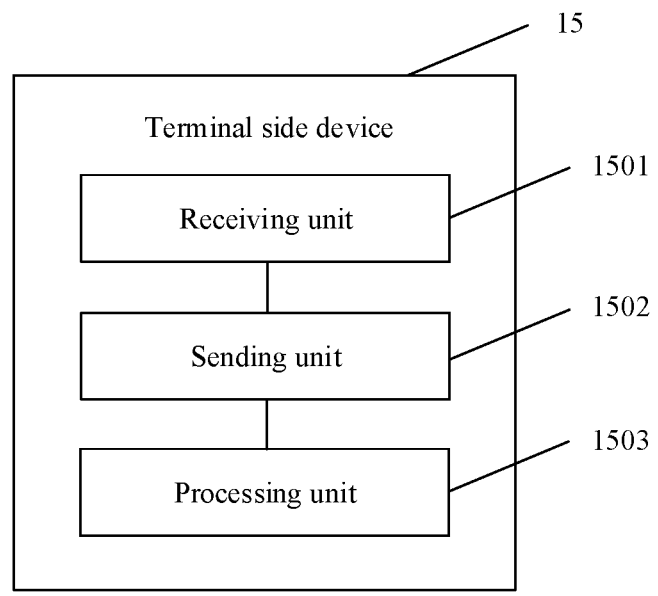
FIG. 15 is a schematic diagram of an internal structure of another terminal side device according to an embodiment of this application.

When each functional module is obtained through division based on each corresponding function, FIG. 15 is a possible schematic structural diagram of a communication apparatus 15 related to the foregoing embodiments. The communication apparatus may be a terminal side device. The terminal side device includes a receiving unit 1501, a sending unit 1502, and a processing unit 1503. In this embodiment of this application, the processing unit 1503 is configured to obtain first uplink data from a first message buffer, where the first message buffer is a buffer specific to a first random access procedure, the first random access procedure is a procedure in which the terminal side device sends a first random access request, sends first uplink data on a first uplink resource, and receives response information, and the response information is a first random access response to the first random access request or a response to the first uplink data. The sending unit 1502 is configured to send the first random access request to a network side device, and send the first uplink data to the network side device on the first uplink resource. The processing unit 1503 is further configured to detect downlink control information, where the downlink control information indicates a resource of the response information. The receiving unit 1501 is configured to receive the response information on the resource indicated by the downlink control information.

In the method embodiment shown in FIG. 7, the receiving unit 1501 is configured to support the terminal side device in performing the processes 702, 706, 708, and 714 in FIG. 7. The sending unit 1502 is configured to support the terminal side device in performing the processes 703, 709, and 712 in FIG. 7. The processing unit 1503 is configured to support the terminal side device in performing the process 705 in FIG. 7. All related content of the steps in the foregoing method embodiments may be cited in function descriptions of the corresponding functional modules. Details are not described herein again.

Figure 16:
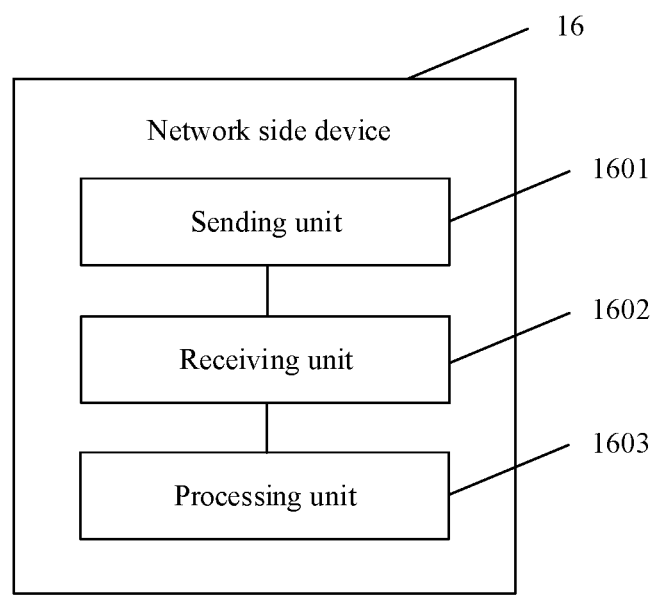
FIG. 16 is a schematic diagram of an internal structure of another network side device according to an embodiment of this application.

When each functional module is obtained through division based on each corresponding function, FIG. 16 is a possible schematic structural diagram of a communication apparatus 16 related to the foregoing embodiments. The communication apparatus may be a network side device. The network side device includes a sending unit 1601 and a receiving unit 1602. In this embodiment of this application, the receiving unit 1602 is configured to receive a first random access request from a terminal side device, and receive first uplink data from the terminal side device on a first uplink resource, where the first uplink data is obtained by the terminal side device from a first message buffer, the first message buffer is a buffer specific to a first random access procedure, the first random access procedure is a procedure in which the terminal side device sends the first random access request, sends the first uplink data on the first uplink resource, and receives response information, and the response information is a first random access response to the first random access request or a response to the first uplink data. The sending unit 1601 is configured to send downlink control information, where the downlink control information indicates a resource of the response information. The sending unit is further configured to send the response information on the resource indicated by the downlink control information.

In the method embodiment shown in FIG. 7, the sending unit 1601 is configured to support the network side device in performing the processes 701, 704, 707, 710, and 713 in FIG. 7. All related content of the steps in the foregoing method embodiments may be cited in function descriptions of the corresponding functional modules. Details are not described herein again.

Division into the modules in the embodiments of this application is an example, is merely division into logical functions, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module. For example, in the embodiments of this application, the receiving unit and the sending unit may be integrated into a transceiver unit.

All or a part of the methods in the embodiments of this application may be implemented by using software, hardware, firmware, or any combination thereof. When software is used to implement the methods, all or a part of the methods may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, a network side device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It is clear that a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A random access method comprising:
    obtaining, by a terminal side device, first uplink data from a first message buffer, wherein the first message buffer is a buffer used for a first random access procedure, the first random access procedure is a procedure in which the terminal side device sends a first random access request, sends the first uplink data on a first uplink resource, and receives response information, and the response information is a first random access response to the first random access request or a response to the first uplink data;
    sending, by the terminal side device, the first random access request to a network side device, and sending the first uplink data to the network side device on the first uplink resource;
    detecting, by the terminal side device, downlink control information, wherein the downlink control information indicates a resource of the response information;
    receiving, by the terminal side device, the response information on the resource indicated by the downlink control information; and
    wherein a second message buffer is a buffer used for a second random access procedure; and in response to the first random access procedure not having been completed, and further the second message buffer having no uplink data and the first message buffer having uplink data, the method further comprises:
    storing, by the terminal side device, the uplink data in the first message buffer into the second message buffer; and
    obtaining, by the terminal side device, second uplink data from the second message buffer in the second random access procedure.

2. The random access method according to claim 1, further comprising:
    in response to the terminal side device initializing the first random access procedure, setting, by the terminal side device, a second counter to an initial value, wherein the second counter is a counter shared by the first random access procedure and the second random access procedure.

3. The random access method according to claim 2, wherein
    the second counter comprises at least one of: a second random access preamble sending counter or a second power ramping counter.

4. The random access method according to claim 3, wherein
    in response to contention resolution in the first random access procedure or the second random access procedure failing, increasing, by the terminal side device, a count value of the second random access preamble sending counter by 1.

5. The random access method according to claim 3, wherein
    in response to the terminal side device initiating the first random access procedure again or initiating the second random access procedure, increasing, by the terminal side device, a count value of the second power ramping counter by 1.

6. A terminal side device comprising: at least one processor and at least one memory storing instructions; wherein the instructions are executed by the at least one processor to cause the terminal side device to perform a method of:
    obtaining first uplink data from a first message buffer, wherein the first message buffer is a buffer used for a first random access procedure, the first random access procedure is a procedure in which the terminal side device sends a first random access request, sends the first uplink data on a first uplink resource, and receives response information, and the response information is a first random access response to the first random access request or a response to the first uplink data;
    sending the first random access request to a network side device, and sending the first uplink data to the network side device on the first uplink resource;
    detecting downlink control information, wherein the downlink control information indicates a resource of the response information;
    receiving the response information on the resource indicated by the downlink control information; and
    wherein a second message buffer is a buffer used for a second random access procedure; and in response to the first random access procedure not having been completed, and further the second message buffer having no uplink data and the first message buffer having uplink data, the method further comprises:
    storing the uplink data in the first message buffer into the second message buffer; and
    obtaining second uplink data from the second message buffer in the second random access procedure.

7. The device according to claim 6, wherein the method further comprises:
    in response to the terminal side device initializing the first random access procedure, setting a second counter to an initial value, wherein the second counter is a counter shared by the first random access procedure and the second random access procedure.

8. The device according to claim 7, wherein
    the second counter comprises at least one of: a second random access preamble sending counter or a second power ramping counter.

9. The device according to claim 8, wherein the method further comprises:
   in response to contention resolution in the first random access procedure or the second random access procedure failing, increasing a count value of the second random access preamble sending counter by 1.

10. The device according to claim 8, wherein the method further comprises:
    in response to the terminal side device initiating the first random access procedure again or initiating the second random access procedure, increasing a count value of the second power ramping counter by 1.

11. A non-transitory computer-readable storage medium, comprising instructions, wherein when the instructions are run on a terminal side device, the terminal side device is caused to perform a method of:
    obtaining first uplink data from a first message buffer, wherein the first message buffer is a buffer used for a first random access procedure, the first random access procedure is a procedure in which the terminal side device sends a first random access request, sends the first uplink data on a first uplink resource, and receives response information, and the response information is a first random access response to the first random access request or a response to the first uplink data;
    sending the first random access request to a network side device, and sending the first uplink data to the network side device on the first uplink resource;
    detecting downlink control information, wherein the downlink control information indicates a resource of the response information;
    receiving the response information on the resource indicated by the downlink control information, and wherein a second message buffer is a buffer used for a second random access procedure; and in response to the first random access procedure not having been completed, and further the second message buffer having no uplink data and the first message buffer having uplink data, the method further comprises:
    storing the uplink data in the first message buffer into the second message buffer; and
    obtaining second uplink data from the second message buffer in the second random access procedure.

12. The medium according to claim 11, wherein the method further comprises:
    in response to the terminal side device initializing the first random access procedure, setting a second counter to an initial value, wherein the second counter is a counter shared by the first random access procedure and the second random access procedure.

13. The medium according to claim 12, wherein the second counter comprises at least one of: a second random access preamble sending counter or a second power ramping counter.

14. The medium according to claim 13, wherein the method further comprises:
    in response to contention resolution in the first random access procedure or the second random access procedure failing, increasing a count value of the second random access preamble sending counter by 1.

15. The medium according to claim 13, wherein the method further comprises:
    in response to the terminal side device initiating the first random access procedure again or initiating the second random access procedure, increasing a count value of the second power ramping counter by 1.

* * * * *